April 11, 1967   W. A. WATHEN   3,313,094
MOWER MOUNTING MECHANISM
Original Filed Nov. 28, 1962   4 Sheets-Sheet 4

INVENTOR.
William A. Wathen
BY
Bernard, McGlynn & Reising
ATTORNEYS

United States Patent Office 3,313,094
Patented Apr. 11, 1967

3,313,094
MOWER MOUNTING MECHANISM
William A. Wathen, Detroit, Mich., assignor to Massey-Ferguson Inc., Detroit, Mich., a corporation of Maryland
Original application Nov. 28, 1962, Ser. No. 240,541, now Patent No. 3,234,718, dated Feb. 15, 1966. Divided and this application July 22, 1965, Ser. No. 474,002
3 Claims. (Cl. 56—25)

This application is a division of Ser. No. 240,541, entitled "Mower Construction," filed Nov. 28, 1962, and now Patent No. 3,234,718. This invention relates to mowers and similar implements of the type adapted to be pivotally mounted on a tractor for swinging movement between a lowered mowing or other work-performing position and a lifted transport position and, in particular, relates to a mechanism for removably pivotally mounting a side mounted mower on a tractor for movement between such positions aforementioned.

Referring by way of example particularly to side mounted mowers of the type to which the present invention specifically although not exclusively pertains and which have been used extensively in the past year for mowing grass, weeds and the like, such side mounted mowers typically comprise a mower frame including a drag bar adapted to have one end thereof suitably pivotally connected to one side of a wheeled vehicle, such as an agricultural tractor, so as to extend transversely therefrom for swinging movement between a lowered mowing position and a lifted transport position, cutter bar including a cooperaitng reciprocable sickle blade pivotally mounted on the other end of the drag bar for swinging movement independently of and relative thereto between a lowered mowing position and a lifted road transport position, a suitable mower drive mechanism such as a pitman drive operatively connected to the aforementioned sickle blade to reciprocate the latter relative to the cutter bar, and a selectively operable or adjustable lift control mechanism connected to the aforementioned drag bar and cutter bar to control lifting and lowering movement thereof in substantial unison between the aforementioned lowered mowing and lifted transport positions of the drag bar, such control mechanism also being operable to permit swinging movement of the cutter bar independently of actuation of the lift control mechanism in the event that the cutter bar should strike an obstruction during mowing, or to swing the cutter bar between its lowered mowing and road transport positions relative to the drag bar.

Since such a mower construction is normally only temporarily attached to a tractor for performing mowing operations and then detached to free the tractor for a different type of use, it is highly desirable to provide a mounting mechanism for readily removably mounting a mower construction of the type aforementioned on a given tractor, and which mounting mechanism will accommodate pivotal movement of the mower construction while firmly mounting the mower construction to the tractor.

In view of the foregoing considertions, the present invention is directed to a mounting mechanism for a mower or the like of the type including a drag bar having mowing means or a cutter bar mounted thereon, such mounting mechanism being operable to readily removably mount the mower for substantially vertical swinging movement relative to the tractor.

More specifically, the invention is particularly characterized by a mounting mechanism of the type aforementioned comprising a support adapted to be rigidly secured to a vehicle and including saddle means having an axis extending substantially longitudinally of the latter, bearing means secured to one end of the drag bar of the mower and adapted to be removably pivotally seated within the saddle means, a latch member pivotally mounted on the support and including a retaining means at one end thereof cooperable with the saddle means to removably retain the bearing means within the latter, and means at the other end of the latch member for releasably locking the latter to the support with the bearing means pivotally retained within and between the aforementioned retaining and saddle means.

In order to facilitate an understanding of the invention, a preferred embodiment thereof will now be described with reference to the accompanying drawings in which.

Figure 1:
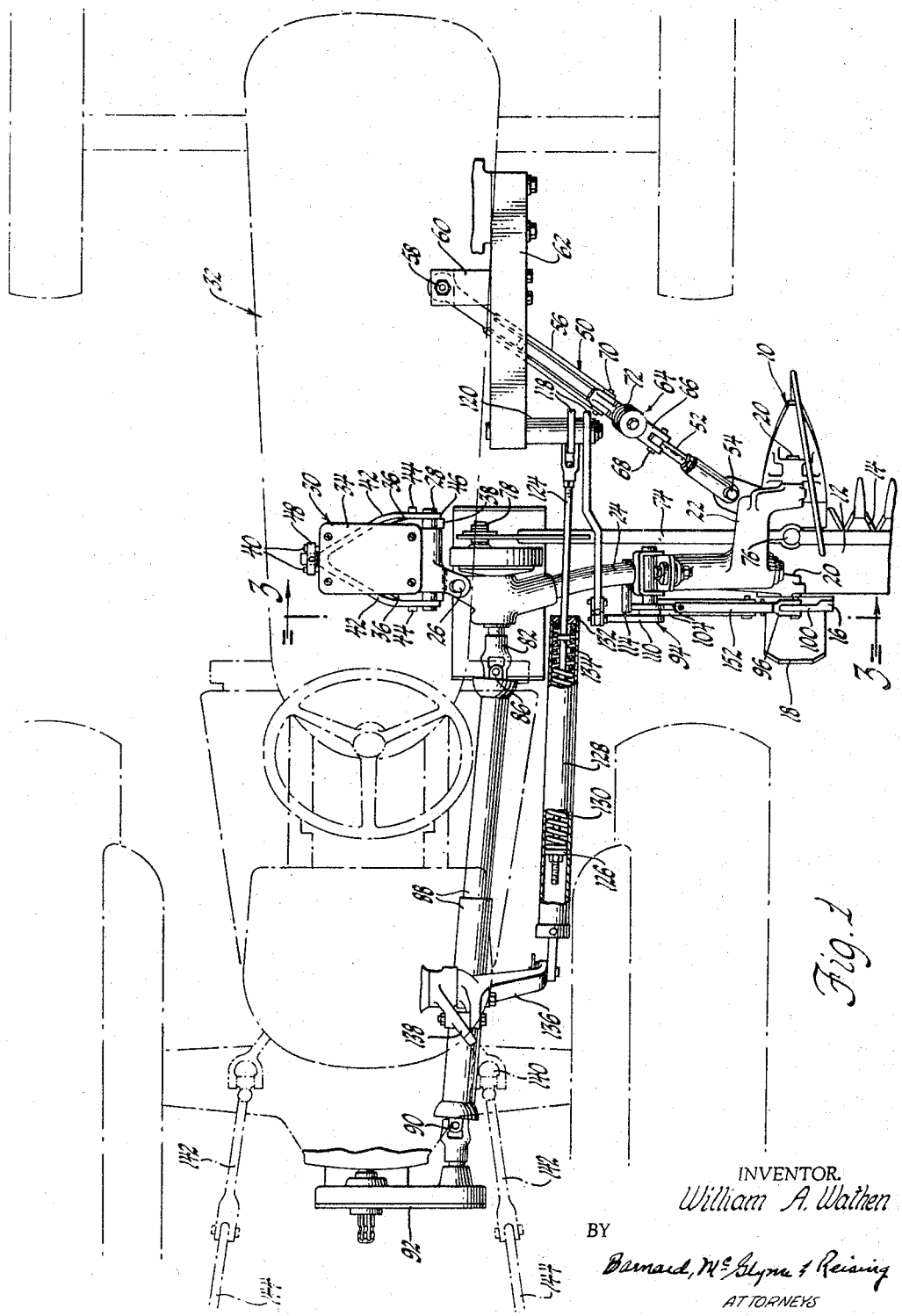
FIGURE 1 is a fragmentary top plan view of a side mounted mower constructed in accordance with this invention and installed on an agricultural tractor indicated in dotted lines, the mower being disposed in a lower mowing position.

Referring now to the drawings, a side mounted mower construction is indicated generally at 10 and comprises a cutter bar 12 of conventional construction mounting the usual sickle blade 14 for reciprocation thereon and including a head member 16 including the ground-engaging skid or shoe 18 at one end thereof pivotally hinged in the usual manner as indicated at 20 to the respective arms of a yoke 22 adjustably mounted in the usual manner about the axis of one end of a drag bar 24. The other end of the drag bar is suitably pivotally connected as indicated at 26 to a bearing member including the bearing shaft or pin 28 adapted to be detachably pivotally connected within a mounting mechanism indicated generally at 30 in FIGURES 1, 3 and 5 carried beneath the frame of a suitable vehicle, such as a conventional agricultural tractor, indicated generally at 32 and illustrated in dotted lines.

More specifically, the mounting mechanism 30 comprises an integral support plate 34 adapted to be suitably rigidly secured beneath the tractor frame and including at one end thereof a pair of longitudinally spaced depending brackets 36 each terminating in an upwardly opening hook-shaped saddle member 38 and, at the other end thereof, a pair of spaced locking brackets 40. An integral latch member includes a pair of latch arms 42 embracing and respectively pivotally connected intermediate their ends as indicated at 44 to the brackets 36, and each including a downwardly opening hook-shaped retaining member 46 and being rigidly interconnected at the other ends thereof. A suitable fastener swivelly mounts a locking lug 48 on the latch lever, the lug being thus adapted to be removably engaged upon the locking brackets 40.

Figure 3:
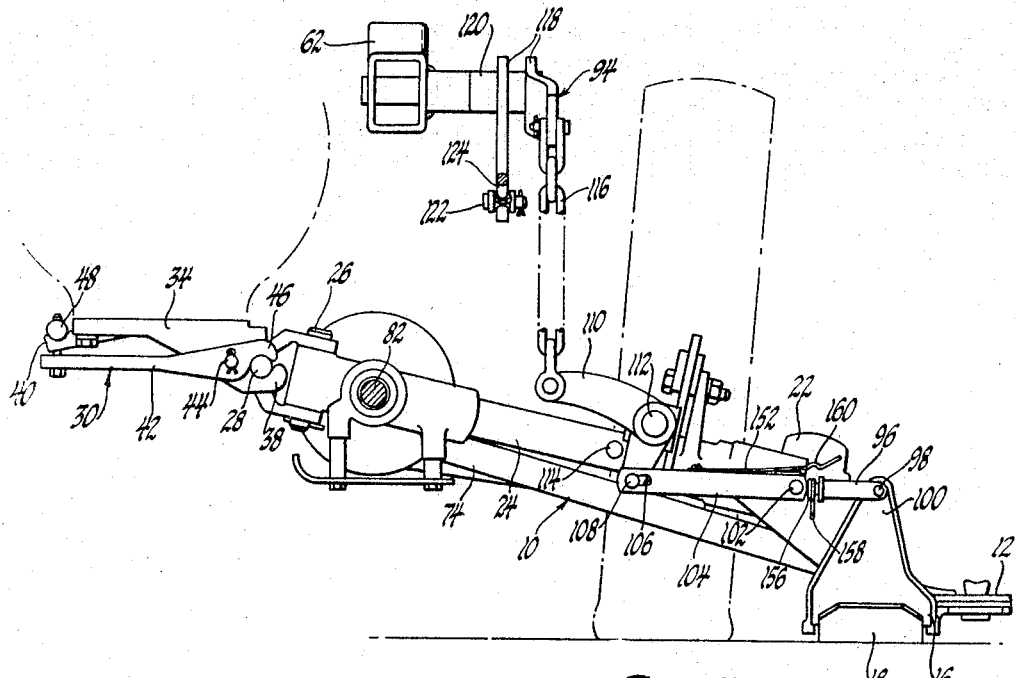
FIGURE 3 is an enlarged fragmentary view taken on line 3—3 of FIGURE 1.
Figures 5, 6:
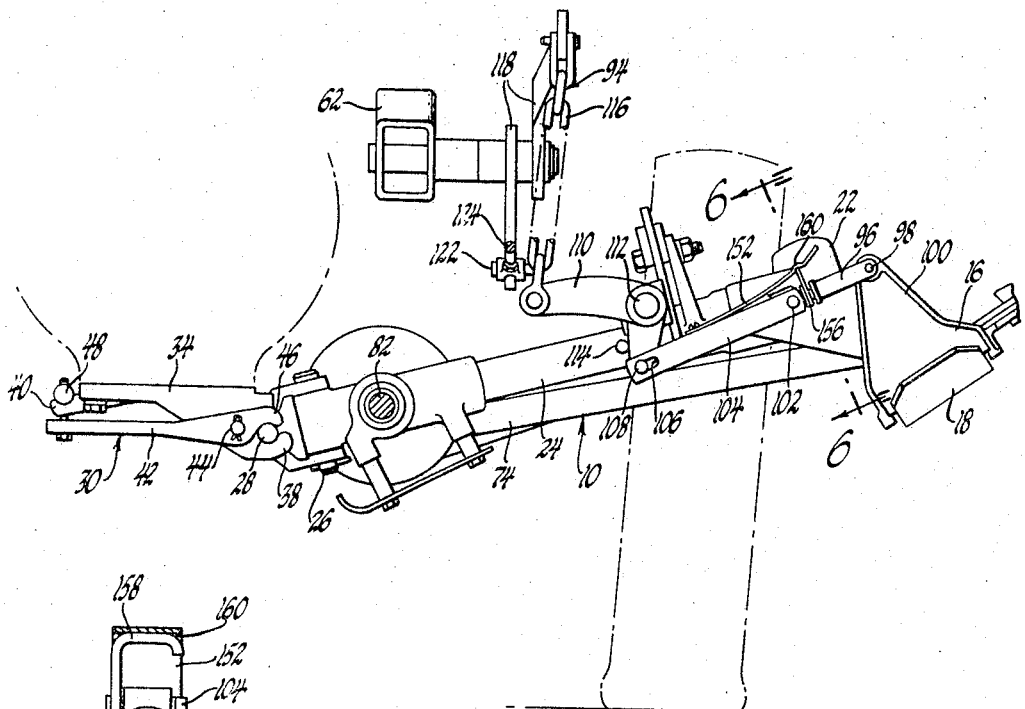
FIGURE 5 is a view corresponding generally to FIGURE 3, but illustrates the mower including the drag bar and cutter bar thereof in a field transport position.
FIGURE 6 is an enlarged sectional view taken on line 6—6 of FIGURE 5.

Thus, it will be appreciated that the latch lever construction including the arms 42 are adapted to be pivoted counterclockwise in either of FIGURES 3 and 5 to move the retaining memebrs 46 away from the saddle members 38 to permit removably seating the bearing shaft or pin 28 within the latter. At this time, the latch member may be pivoted to the position illustrated in FIGURES 3 and 5 and the lug 48 seated upon the locking brackets 40 and tightened thereagainst to confine the bearing shaft or pin between the respective saddle and retaining members for pivotal movement about an axis extending generally parallel to the longitudinal axis of the tractor 32. Conversely, the drag bar 24 and cutter bar 12 attached thereto may be readily disconnected from the tractor by a reverse operation as will be readily apparent.

Figure 2:
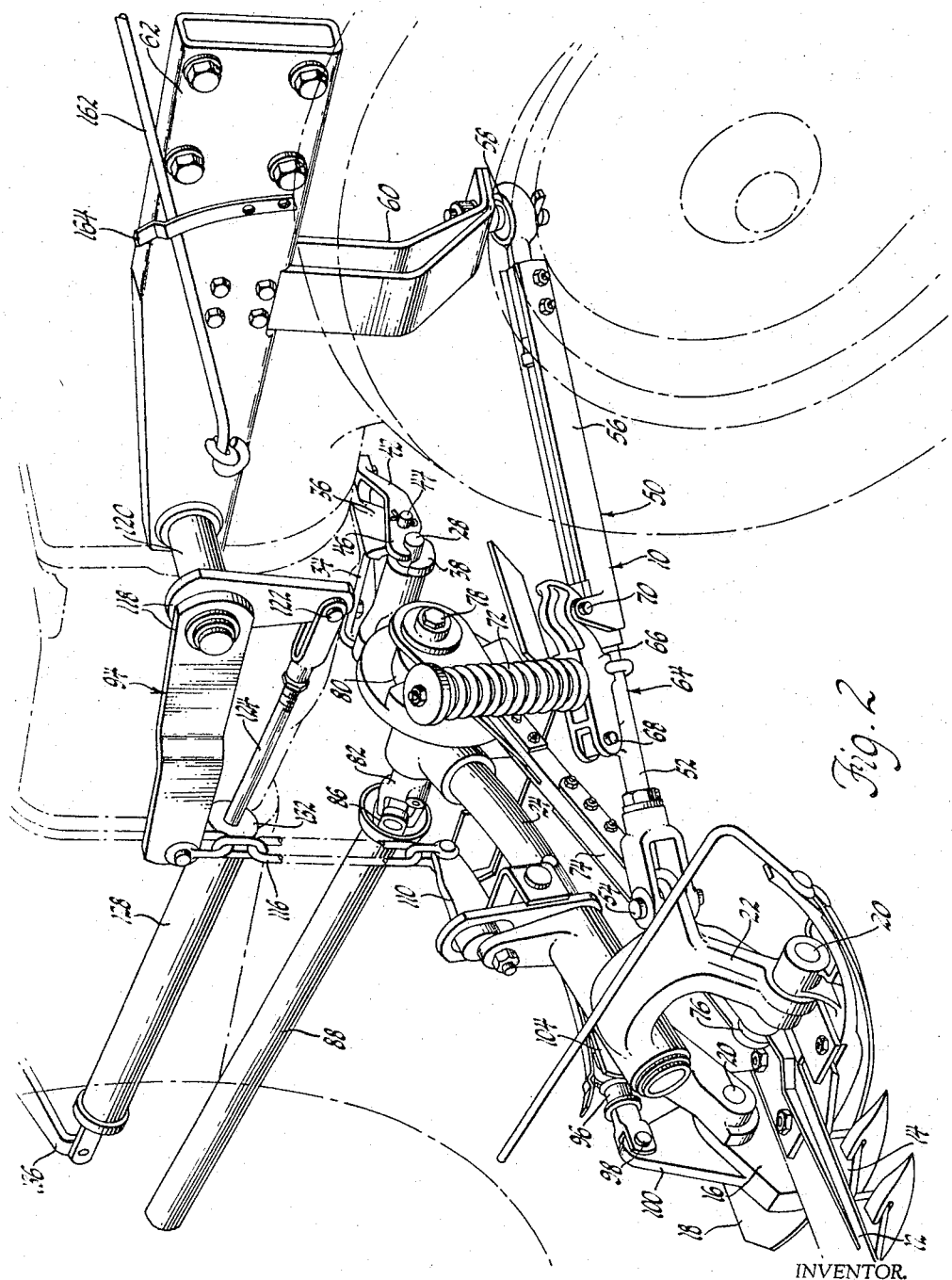
FIGURE 2 is an enlarged fragmentary perspective view of the tractor and mower of FIGURE 1.

A conventional breakaway strut construction is indicated generally at 50 in FIGURES 1 and 2 and comprises a first strut member 52 suitably pivotally coupled as indicated at 54 to the yoke 22 and telescopically received by a second strut member 56 suitably removably swivelly connected as indicated at 58 to a depending arm 60 fixed to a mounting plate 62 adapted to be suitably rigidly secured to the tractor 32 along one forward side thereof. A conventional automatically engageable and disengageable spring biased breakaway latch is indicated generally at 64 and comprises the usual latch arm 66 having one end thereof pivotally mounted on the first strut member 52 as indicated at 68, and the other end adapted for releasable latching engagement with a latching pin or lug 70 carried by the second strut member 56. The usual spring 72 is mounted on the first strut member and engages latch arm 66 to bias the latter into engagement with the pin or lug 70. The breakaway strut construction has the usual function of normally maintaining the drag bar 24 and the cutter bar 12 in transversely extending relation relative to the tractor 32 as illustrated in FIGURES 1 and 2 of the drawings while, in response to a predetermined load imposed upon the cutter bar and drag bar by an obstruction or the like, the latch arm 66 overcomes the force of the spring 72 and disengages from the lug or pin 70 to permit the cutter bar and drag bar to swing rearwardly about the axis of the pivotal connection 26 of the drag bar to the bearing pin or shaft 26. The latch is automatically re-engageable merely by backing the tractor to a suitable extent to cam the latch arm 66 back up over the latch lug or pin 70.

The drive mechanism for the sickle blade 14 is of conventional construction and comprises the pitman rod or arm 74 universally connected at 76 to the sickle blade and pivotally connected at 78 to a conventional rotatable crank 80 driven by a shaft 82 rotatably disposed within the drag arm 24 and connected through a universal joint 86 to one end of a conventional power-take-off shaft assembly 88 having its other end connected through the universal joint 90 to a rear mounted power-take-off drive mechanism 92, it being understood that other power-take-off drive mechanisms such as side mounted or front mounted may, of course, be employed. Furthermore, it will be appreciated that the conventional power-take-off shaft assembly 88 including the universal joint connections at either end thereof permits free breakaway swinging movement of the drag bar and cutter bar to the left in FIGURE 1 in the event of release of the breakaway latch as previously described, due in particular to the splined relatively reciprocable connection between the conventional elements of the power-take-off shaft assembly.

The lift control mechanism indicated generally at 94 comprises, with particular reference to FIGURES 3 to 7, a gag link 96 having one end suitably pivotally connected as indicated at 98 to an upstanding arm 100 secured to the cutter bar head 16, and the other end pivotally connected at 102 to one end of a second gag link 104 having suitably elongate slots 106 in the other end thereof slidably and pivotally connected about pins 108 carried at one end of a bell-crank type lift control lever 110 pivotally connected at 112 on the drag bar 24 on an axis substantially parallel with the axes of pivotal connections 20, 98, 102 and 108. A lift and stop pin 114 extends from the drag bar 24 into the path of pivotal movement of the lift control lever 110 for a purpose to be described hereinafter.

The other end of the lift control lever 110 is pivotally connected through a chain or the like 116 to one end of a bell-crank type lever assembly 118 pivotally journaled as indicated at 120 on the mounting plate 62, while the other end thereof is pivotally connected at 122 to one end of a rod 124 having an adjustable head 126 reciprocably disposed within a cylindrical housing 128, a spring 130 being disposed and acting between the head 126 and one end 132 of the cylindrical housing 128 through which rod 124 extends. As will be further apparent hereinafter, with the housing 128 disposed in any selected adjusted position, spring 130 continuously urges the lever assembly 118 clockwise in FIGURE 2 and the lift control lever 110 clockwise in FIGURES 3 through 5 and 7 toward the lift and stop pin 114, while the spring yieldably cushions movement of the lever assembly 118 and lift control lever in the opposite directions as limited by engagement of a stop member 34 on rod 124 with the end 132 of housing 128. The other end of the housing 128 is suitably pivotally connected to a lever arm 136 suitably pivotally journaled on the tractor 32 and pivotally driven by a drive arm 138 adapted to be universally pivotally connected as indicated at 140 to one end of one of the upper links 142 of a known rear draft mechanism on the tractor, the other end of such upper links being pivotally connected in the usual manner to lower links 144 thereof. As will be appreciated, a suitable hydraulic mechanism is provided on the tractor for actuating the draft mechanism aforedescribed to pivot the lever arm 136 in one direction or the other and to hold it in any selected adjusted position, which motion is transmitted through the housing 128, spring 130, rod 124, lever assembly 118 and chain 116 to the lift control lever 110 and gag links 104 and 96.

Figure 4:
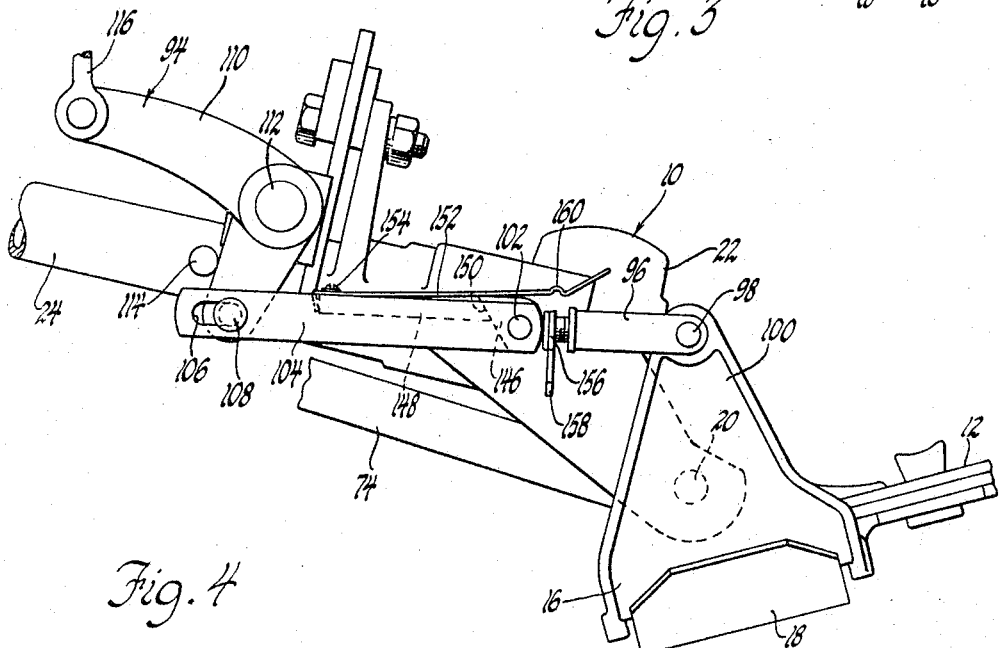
FIGURE 4 is an enlarged fragmentary view corresponding generally to FIGURE 3, but illustrates an extreme lifted position of the cutter bar relative to the drag bar of the mower in the mowing positions thereof.
Figure 7:
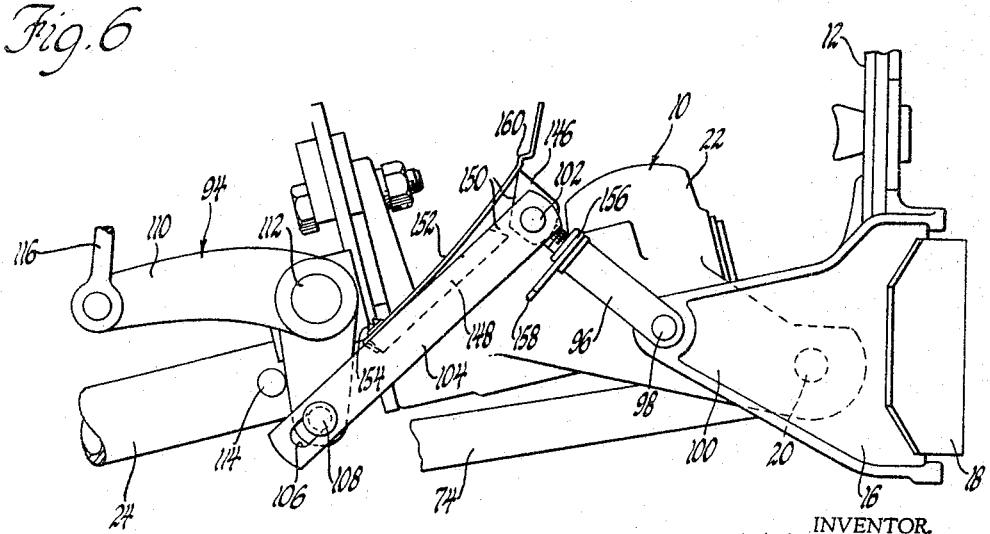
FIGURE 7 is an enlarged fragmentary view corresponding generally to FIGURE 5, but illustrates the relative positions of the mower drag bar and cutter bar in moving the latter from the field transport position of FIGURE 5 to a road transport position.

Referring particularly to FIGURES 4 and 7, the respective gag links 96 and 104 include cooperable stop members 146 and 148, respectively, including stop surfaces 150 which are engageable in the locking position of the gag linkage as illustrated particularly in FIGURES 3 through 5 to positively prevent breaking of the gag linkage in one direction or downwardly in the aforementioned figures of the drawing, while permitting breaking of the linkage to an unlocking position upwardly or in the opposite direction when desired and in the manner to be described hereinafter. In this regard, in the locking position of the gag linkage forming, in effect, a rigid strut connection between the pivotal connections 98 and 108, these latter pivotal connections are illustrated in the drawings as being substantially dead center or aligned with the pivotal interconnection 102 of the gag links with the stop surfaces 150 engaged. However, and if desired, it will be readily appreciated that the pivotal interconnection 102 of the gag links may be disposed somewhat off or overcenter downwardly in FIGURES 3 to 5 with respect to the pivotal connections 98 and 108 and as determined by engagement of the stop surfaces 150 to form an even more positive lock. In any event, due particularly to a latch construction to be described, the respective three point pivotal connections of the gag links aforementioned may be substantially aligned and still provide a very positive locking position for the gag linkage preventing any inadvertent breaking movement thereof from the locking to the unlocking position as aforedescribed.

The latch mechanism for the gag linkage comprises a yieldable spring latch clip 152 having one end thereof suitably secured as indicated at 154 to the gag link 104 so as to extend over and against the stop member 146 on the gag link 96 to continuously bias the stop member 146 toward the stop member 148 in the locking position of the gag linkage as illustrated in FIGURES 3 and 4. As referred to above, the yieldable force of the latch clip 152 is selected so as to be sufficient to positively prevent inadvertent upward breaking movement of the gag linkage from the positions shown in FIGURES 3 and 4 even though the pivotal interconnection of the gag links is substantially dead center with the pivotal connections thereof to the lift lever and cutter bar. A relatively rigid latch release bail includes a coiled bight portion 156 surrounding and of greater diameter than a corresponding portion of the gag link 96 so as to be freely pivotal about the axis of the latter, and terminates in a leg 158 adapted to be selectively engaged within a detent groove 160 at the free end of the latch clip 152.

During mowing operations as will be described, the latch release bail will be free of the latch clip 152 and hang from gag link 96 as illustrated in FIGURES 3 and 4. In the event that it is desired to move the cutter bar to a road transport position, the latch release bail may be rotated to the position of FIGURES 5 and 6 so as to engage the detent groove 160 in the latch clip 152 to bias the latter upwardly from the pivotal connection 102 and stop member 146, whereby the free end of the cutter bar 12 may be engaged manually and lifted vertically upwardly to a road transport position relative to the drag bar while the gag linkage breaks upwardly from the position of FIGURES 5 and 6 to that of FIGURE 7. As the gag linkage so breaks, the latch release bail automatically moves out of the detent groove 160 and is free to swing downwardly about the gag link 96 to the position shown in FIGURE 7 whereby, upon subsequently dropping the cutter bar from a road transport to a mowing position relative to the drag bar 24, the stop member 146 is free to cam against the yieldable spring latch clip 152 back into a locking position with the other gag link stop member 148 as illustrated in FIGURES 3 and 5, at which time the latch clip retains the gag links in their locking position as aforedescribed.

Referring now to the operation of the lift control mechanism 94, it will first be noted that FIGURES 3 and 4 illustrate the drag bar 24 and cutter bar 12 in their lowered mowing positions relative to each other and the tractor 36. These positions have been assumed in a manner to be described more fully hereinafter due to actuation of the hydraulic control system and the draft mechanism of the tractor as previously referred to, and the hydraulic system then placed in a "hold" condition to suspend the drag bar and cutter bar. FIGURE 3 illustrates one extreme position of the gag link 104 relative to the lift control lever 110 due to the tendency of the cutter bar and its weight to pivot the cutter bar head 16 clockwise in FIGURE 3 about its pivotal connection to the drag bar yoke 22, and in which position one end of the slots 106 engage with the pivot pins 108 on the lift control lever. In this position, and as the vehicle traverses rough and irregular terrain and the mowing operation is conducted, the spring 130 yieldably suspends the drag bar and cutter bar against downward swinging movement thereof and as limited by engagement of the stop member 134 with the cooperable end 132 of the cylindrical housing 128. FIGURE 4 illustrates the other extreme position of gag link 104 relative to lift control lever 110 and also the extreme upper limit of movement of the cutter bar relative to the drag bar in the lowered mowing positions thereof. Thus, due to dynamic forces or otherwise, any tendency of the cutter bar 12 to swing upwardly to an undesired extent relative to and about the pivotal connection 20 to the drag bar yoke 22 permits the spring 130 to extend within the housing 128 to the extent permitted by engagement of the lift control lever 110 with the stop and lift pin 114, the gag link 104 being capable of moving relative to the lift control lever until the other ends of the slots 106 engage the pivot pins 108 on the lift control lever. Thus, in the lowered mowing positions of the drag bar and cutter bar as illustrated in FIGURES 3 and 4, the spring 130 yieldably suspends the drag bar and cutter bar within limits defined by stop and lift pin 114 and stop member 134, while the gag links 96 and 104 in the locking position thereof and the lost motion connection comprising the slots 106 and pivot pins 108 on the lift control lever provide a positive predetermined limit of relative swinging movement of the cutter bar upwardly and downwardly relative to the drag bar in any selected adjusted position of the lift control mechanism. As a consequence, while the cutter bar is permitted to float to ride over obstructions or the like, it is impossible for the cutter bar to move, and particularly upwardly, relative to the drag bar to any extent which would cause forces, particularly of a compressive nature, to act upon the pitman arm 74 to twist, bend or otherwise damage the latter, and to positively prevent the possibility of the cutter bar moving toward a substantially vertical position in which the vehicle operator might be seriously injured.

At this juncture, it will now be appreciated that the gag linkage may be moved to the unlocking position of FIGURE 7 as aforedescribed and the cutter bar 12 swung upwardly to a road transport position relative to the drag bar 24 irrespective of whether the latter is in the lowered mowing position of FIGURES 3 and 4 or in the transport position of FIGURES 5 and 7. However, for the purpose of this illustration, it will be assumed that the cutter bar will be moved to its road transport position after lifting the drag bar to its transport position as illustrated in FIGURES 5 and 7.

Thus, when it is desired to lift the drag bar 24 and cutter bar 12 from the lowered mowing position of FIGURE 3 to the field transport position of FIGURE 5, the hydraulic control system on the tractor is operated to actuate the draft linkage thereof to pivot the lever arm 136 rearwardly in FIGURE 1, which motion is transmitted through the housing 128, spring 130, rod 124, bell-crank lever assembly 118 and chain 116 to the lift control lever 110 to pivot the latter clockwise in FIGURE 3 and 5. In response to actuation of the lift control mechanism in this manner, the lift control lever 110 will move against the lift and stop pin 114, at which time continued pivotal movement of the lift control lever acting against the pin will bodily lift the drag bar 24 to the position of FIGURE 5, the gag linkage of course forming a rigid link between the lift lever and the cutter bar to move the latter upwardly in unison to the position of FIGURE 5. In this position, the hydraulic control system is deactuated to hold the drag bar and cutter bar in this position, at which time the latch release bail may be engaged with the latch clip 152 as previously described and as illustrated in FIGURES 5 and 6 and the free end of the cutter bar manually pivoted upwardy to a road transport position relative to the drag bar as the gag linkage breaks upwardly as illustrated in FIGURE 7. The cutter bar is then latched to the vehicle itself by means of the hook end (not shown) of a conventional latch rod 162 suitably hingedly connected to the mounting plate 62 and normally held thereto by a retaining clip 164 as shown in FIGURE 2.

When it is desired to return the cutter bar to its mowing position relative to the drag bar 24, it is only necessary to detach the latch rod 162 and manually lower the cutter bar 12 to the position illustrated in FIGURE 5 as limited by the gag linkage which automatically returns to its locking position as aforedescribed. Thereafter, the hydraulic control system on the tractor may be operated to actuate the draft linkage thereof, causing the lever arm 136 to move forwardly in FIGURE 1 to pivot the lift control lever counterclockwise in FIGURE 5 which, in cooperation with the lift and stop pin 114, gradually lowers the drag bar 24 and the cutter bar 12 to the lowered mowing positions of FIGURE 3.

The embodiments of the invention in which an exclusive property or privilege is claimed are defined as follows:

1. Mounting means adapted for detachably pivotally mounting a mower drag bar to a vehicle for substantially vertical swinging movement relative thereto, said mounting means comprising a support adapted to be secured to a vehicle and including saddle means adapted to removably pivotally support bearing means secured to the drag bar, a latch member pivotally mounted on said support and including retaining means cooperable with said saddle means to retain the bearing means in the latter, and means for releasably locking said latch member to said support with the bearing means retained between said retaining and saddle means.

2. In combination with a mower or the like of the type including a drag bar having mowing means connected thereto; the improvement comprising mounting means adapted for detachably pivotally mounting said drag bar to a vehicle for swinging movement relative thereto, said mounting means comprising a support adapted adapted to be secured to a vehicle and including saddle means, bearing means secured to said drag bar and adapted to be removably pivotally mounted within said saddle means, a latch member pivotally mounted on said support and including retaining means cooperable with said saddle means to removably retain said bearing means in the latter, and means for releasably locking said latch member to said support with said bearing means retained between said retaining and saddle means.

3. In combination, mower or the like of the type including a drag bar having mowing means connected to one end thereof, and mounting means adapted for detachably pivotally mounting the other end of said drag bar to a vehicle so as to extend transversely therefrom for swinging movement relative thereto; said mounting means comprising a support adapted to be secured to a vehicle and including saddle means having an axis extending substantially longitudinally of the latter, bearing means secured to said other end of said drag bar and adapted to be removably pivotally mounted within said saddle means, a latch member pivotally mounted on said support and including retaining means at one end thereof cooperable with said saddle means to removably retain said bearing means in the latter, and means for releasably locking said latch member to said support with said bearing means retained between said retaining and saddle means.

References Cited by the Examiner
UNITED STATES PATENTS

| | | |
|---|---|---|
| 1,167,122 | 1/1916 | Simmons. |
| 2,291,987 | 8/1942 | Rogers _____ 56—25 |
| 2,568,931 | 9/1951 | Paul _____ 56—25 |

ABRAHAM G. STONE, *Primary Examiner.*

RUSSELL R. KINSEY, *Examiner.*